April 25, 1967     T. N. COFER     3,316,342
POWER TRANSMISSION LINE INCLUDING FLEXIBLE
AND RIGID INSULATOR ELEMENTS
Filed Feb. 5, 1964     3 Sheets-Sheet 1

INVENTOR.
THOMAS N. COFER
ATTORNEYS

April 25, 1967 T. N. COFER 3,316,342
POWER TRANSMISSION LINE INCLUDING FLEXIBLE
AND RIGID INSULATOR ELEMENTS
Filed Feb. 5, 1964 3 Sheets-Sheet 2

INVENTOR.
THOMAS N. COFER
BY Mason, Kolehmainen,
Rathburn & Wyss.
ATTORNEYS

United States Patent Office 3,316,342
Patented Apr. 25, 1967

3,316,342
POWER TRANSMISSION LINE INCLUDING FLEXI-
BLE AND RIGID INSULATOR ELEMENTS
Thomas N. Cofer, 1911 S. 4th St.,
Springfield, Ill. 62703
Filed Feb. 5, 1964, Ser. No. 342,663
7 Claims. (Cl. 174—45)

The present invention relates to a power transmission line and more particularly to a new and improved transmission conductor support for supporting a high voltage electrical power transmission conductor from a transmission line superstructure such as a metal tower or wooden poles.

It is highly desirable and therefore an object of the present invention to provide a new and improved transmission conductor support which is better able to withstand extreme dynamic loads imposed on the line by weather conditions such as wide variations in the temperatures, high winds, snow and ice loads, conductor breakage and the like, and to provide a conductor support which may be readily and economically manufactured, installed, and serviced.

High voltage transmission lines commonly support the power transmission conductor from superstructure by means of a flexible string of suspension insulators. Prior insulator strings have been made from either ball and socket type insulators or clevis type insulators joined together to provide the desired electrical isolation of the conductor. Heretofore difficulty has been experienced with such prior insulator strings, particularly when subjected to extreme loads. Ball and socket type insulator strings have proven unsatisfactory under loading conditions which would provide slack in the insulated string. Moreover, while clevis type insulators are flexible to curve in one direction, they are rigid in the opposite direction. Such a string of clevis type insulators would be unsatisfactory under loading conditions transverse to the flexible axis of the string. Moreover, since a string of high voltage insulators has considerable inertia, difficulty could be experienced with wind conditions which cause "galloping" conductors. Difficulty has also been experienced by such strings of insulators swinging with the conductors toward the supporting superstructure.

It has also been found that sharp protruding ends of pins and cotter keys may be subjected to objectionable corona effects when used in high voltage transmission applications.

It is therefore an object of the present invention to provide a new and improved transmission conductor insulator assembly which is flexible enough to withstand longitudinal displacement along the axis of the transmission line as well as lateral stresses caused by wind loads and the like and additionally the stresses developed in the assembly itself because of snow, ice and other extreme weather conditions without breakage.

A further object of the present invention is the provision of a new and improved transmission conductor support.

A further object of the present invention is the provision of a new and improved insulator assembly for a transmission conductor.

Yet another object of the present invention is the provision of a new and improved transmission conductor insulator assembly which is economical to produce, easy to install or replace on a superstructure, and simple in construction, and which eliminates the need for corona rings and like devices.

The foregoing and other objects and advantages of the present invention are accomplished by the provision of a new and improved transmission conductor support assembly for supporting high voltage electrical transmission conductors from a transmission line superstructure. According to one embodiment of the present invention, the conductor support assembly includes a flexible string of suspension type insulators having its upper end adapted for attachment to the superstructure and supporting a conductor yoke at its lower end. The lowermost insulators in the string are separated from the remainder of the insulators by a metal linking member such as a chain. A rigid strut insulator is provided for lateral support and has one end adapted for attachment to the superstructure and the other end attached to the linking member.

According to another feature of the present invention, one end of the strut insulator is connected to the superstructure by a universal type joint connection, and the other end of the strut insulator is attached to the suspension insulator string by a special swivel clevis fitting with a self-aligning threaded stud which serves two purposes; namely, to prevent the strut insulator from being placed in torsion by a longitudinal movement of the conductor, and to permit the replacement of the strut insulator without disturbing the support of the conductor weight by the suspension insulators.

According to yet another feature of the present invention, there is provided a conductor support assembly of the type comprising a pair of suspension insulator strings having their upper ends connected to the superstructure at points spaced outwardly from their lower ends to provide a somewhat V-shaped assembly. In accordance with the present invention, the lower ends of the insulator strings are connected by a chain to provide flexibility to the conductor support assembly. The chain provides for maximum flexibility of the insulator assembly while providing an inexpensive arrangement which may be readily manufactured and erected.

For a better understanding of the present invention reference should be had to the following detailed description when taken in conjunction with the drawings, in which.

Figure 3:
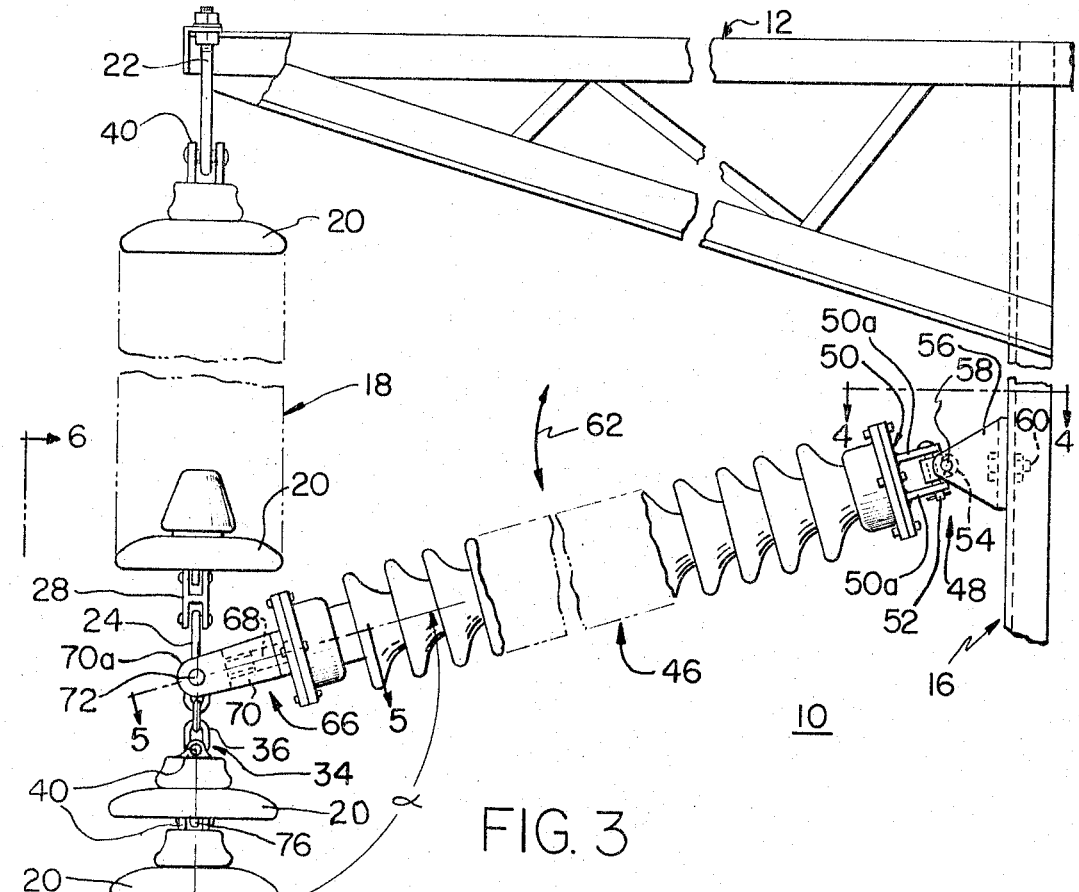
FIG. 3 is a fragmentary elevational view of another one of the conductor support assemblies illustrated in FIG. 1.
Figure 6:
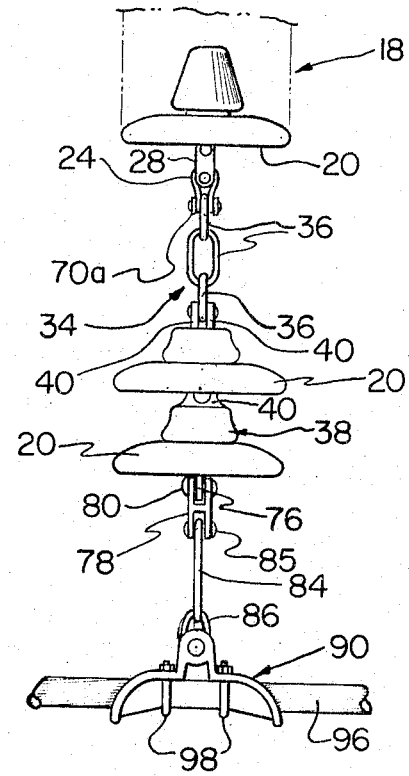
Figure 5:
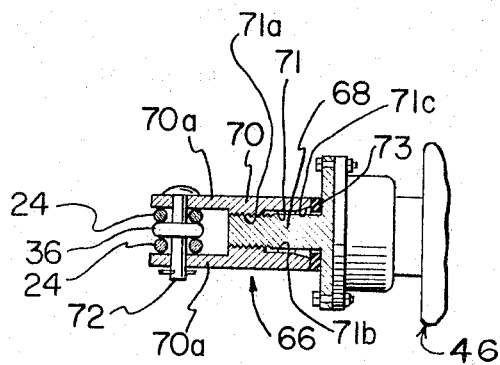

FIG. 5 is an enlarged detailed fragmentary sectional view of the conductor support assembly of FIG. 3, illustrating the swivel joint connection between the strut insulator and the insulator string, and taken substantially along the line 5—5 of FIG. 3; and FIG. 6 is an enlarged detailed fragmentary sectional view of the conductor support assembly of FIG. 3 and taken substantially along line 6—6 of FIG. 3.

The transmission line includes a superstructure or tower 14 having a crossarm 12 carried at the top of a pair of vertical, spaced legs 16 defining a latticed aluminum X-braced H-structure. It is to be understood that conventional wooden poles with crossarms could also be utilized instead of the superstructure 14.

For supporting high voltage transmission conductors from the superstructure, there is provided a pair of outer-spaced transmission conductor support or insulator assemblies 10 and an intermediate conductor support or insulator assembly 11 intermediate the vertical legs 16. Referring first to the outer insulator assemblies 10, each of the insulator assemblies 10, according to the present invention, comprises a flexible string 18 of suspension type insulators 20. The insulators 20 are of the clevis type and each is provided with a clevis fitting 40 at its upper end and a lower depending tang 76 at right angles to the clevis fitting 40. The provision of the clevis fittings 40 and the tangs 76 at right angles to each other provides for flexibility of the insulator string in two directions. The upper one of the insulators 20 is secured to the crossarm 12 by a U-bolt 22 interconnected with its clevis fitting 40 by a pin 23.

The two lowermost of the insulators 20 are separated from the remainder of the insulators by a linking member 34 here shown as formed of metal chain links 36. The linking member 34 is suspended from the upper adjacent insulator 20 by a clevis link 28 and anchor shackle 24.

In order to laterally stabilize the lower end of the flexible string 18 of insulators, there is provided a rigid strut insulator 46 having one end secured to the superstructure 14 by a universal joint 48, and having the other end thereof secured to the linking member 34 by a swivel joint assembly 66. The lowermost of the insulators 20 provide clearance between the conductors and the strut insulator. The strut insulator 46 makes an obtuse angle α, FIG. 3, with the vertical so that the conductors carried by the insulator assembly, when swinging in the wind, will not be blown against the strut insulator. It will be appreciated that regardless of the wind velocity, the conductors will never swing to a horizontal position from the swivel joint assembly 66.

Figure 4:
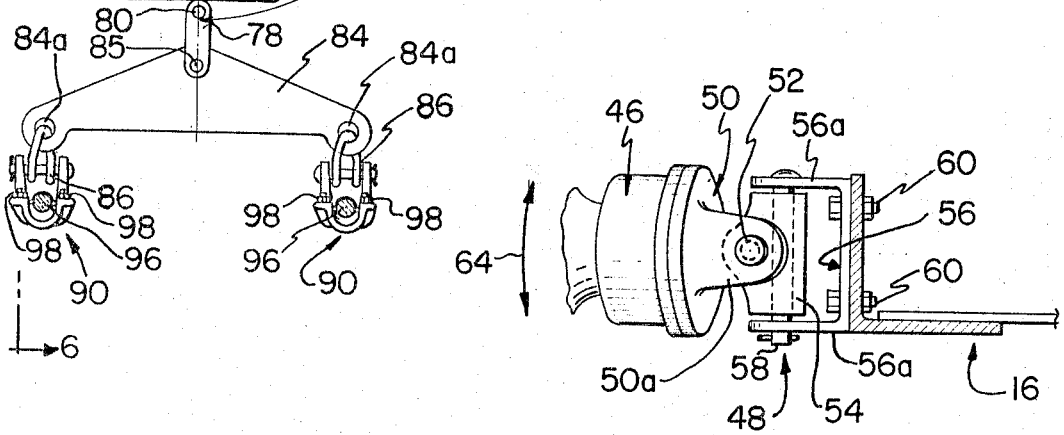
FIG. 4 is a fragmentary plan view of the conductor support assembly of FIG. 3, illustrating the universal joint connection, and taken substantially along the line 4—4 of FIG. 3.

Referring now to the universal joint 48, shown in detail in FIG. 4, the universal joint 48 includes a first fitting 50 secured to the end of the strut insulator 46 and having bracketed extensions 50a. The fitting 50 may be secured to the strut insulator 46 in any suitable manner. There is additionally provided a fitting 56 secured to the respective legs of the superstructure 14. The fitting 56 is provided with spaced legs 56a in a plane at right angles to the extensions 50a of the fitting 50. A universal spider 54 interconnects the fittings 50 and 56 through a first pin 52 and a second pin 58 which are turned at right angles to each other to provide universal type motion between the strut insulator 46 and the superstructure 14. The universal joint assembly 48 allows the rigid strut insulator 46 to move in all directions relative to the superstructure, as indicated by the arrows 62 in FIG. 3, and the arrows 64 in FIG. 4. Moreover, the pins 52 and 58 are readily removable to provide a quickly detachable connection.

The other end of the rigid insulator 46 is secured to the linking member 34 by means of the swivel joint assembly 66, best illustrated in detail in FIG. 5. The swivel joint assembly 66 includes a threaded male member 68 secured to the end of the strut insulator 46, and threaded into a female clevis member 70. The clevis member 70 is provided with a pair of extending legs 70a secured to the anchor shackle 24 and one of the chain links 36 by a pin 72 extending thereto.

In order to provide for self aligning of the strut insulator 46 with the female clevis member 70 during assembly and erection, the female clevis member 70 is provided with a threaded countersunk aperture 71 having an inner portion 71a threaded to receive the threaded male member 68, and provided with a countersunk portion 71b somewhat larger in diameter than the threaded male member 68. The countersunk portion 71b has tapered outer walls 71c to aid in starting the threaded member 68 into the aperture 71. To eliminate play between the threaded member 68 and the clevis member 70, a resilient gasket 73 of silicone rubber or other suitable material is provided between the end of the clevis member 70 and the threaded member 68. The gasket 73 is effective to allow rotational movement through the threaded connection while providing a weatherseal in the threaded connection and minimizing play of the connection.

The conductors are supported from the insulator assemblies 10 through a yoke 84 connected to the lowermost insulator 20 in the flexible string 18. A clevis link 78 interconnects the lowermost insulator 20 and the yoke 84, and the clevis link 78 is secured to the insulator by means of a pin 80 and to the yoke by means of a second pin 85. The yoke 84 is provided with two spaced lower holes 84a through which extend twisted clevis pins 86. Each clevis pin 86 supports a suspension clamp 90 which carries a conductor 96. The conductors 96 are held in the respective suspension clamps 90 through a plurality of U-bolts 98.

Advantageously, the new and improved insulator assembly 10 provides better voltage distribution across the string 18 of insulators 20. More specifically, it is known that the voltage across each insulator of an insulator string is not the same but the voltage drop across any particular insulator is dependent upon a number of factors including the capacitance from the supporting superstructure to the conductor. Moreover, the greatest voltage drop will generally occur across the insulator closest to the transmission lines. By the addition of the added metal in the linking member 34, the capacitance on the lower insulators 20 which typically carry the maximum voltage drop is increased, thereby lowering the voltage drop across the lowermost insulators and preventing corona, corrosion, and possibly the breakdown of the insulators. Since this lowermost insulator normally carries the maximum voltage drop, it is the weakest member of the insulator string. Additionally, by carrying a substantial voltage drop across an insulator below the connection of the strut insulator 46 to the vertical string, the voltage across the strut insulator 46 is reduced since it does not carry all the voltage drop of the transmission lines, and the strut insulator 46 need not be manufactured and constructed for the same high voltage as the overall string. That is, since the voltage drop across the strut insulator 46 is reduced by the magnitude of the voltage drop across the lowermost insulators, the strut insulator 46 may be constructed to a lower voltage rating. Additionally, since mechanical clearance is required between the conductor and the strut insulator 46, the clearance is advantageously obtained by the use of the lowermost insulators.

The strut insulator 46 prevents the swing of the insulator string 18, and accordingly allows the use of a narrower right of way with the accompanying advantages such as may result during maintenance of the right of way. Additionally the reduction in the swing of the insulator string permits the use of smaller and less expensive supporting superstructure.

Advantageously, the universal joint 48 and the swivel joint 66 at the ends of the strut insulator 46 affords all the required flexibility to the insulator assembly in the direction along the transmission line. As an example, if the transmission conductors 96 supported by one of the insulator assemblies 10 were to break, then a force would be applied to the insulator assembly 10 in the direction of the transmission line away from the broken portion. The insulator string 18 would swing in the direction of the line, and the strut insulator 46 would rock about an arc fixed at the universal joint 48. The universal joint 48 will accommodate both horizontal and vertical movement of the strut insulator 46. At the same time the swivel joint assembly 66 will allow relative rotational movement between the threaded male member 68 and the clevis member 70, so that no torsional load is transmitted to the strut insulator 46.

Advantageously the strut insulator 46 may be remotely disengaged and replaced without disturbing the insulator string 18 carrying the conductors 96. Servicing of the strut insulator is readily accomplished in the field by first supporting the weight of the strut insulator adjacent the insulator string through a rope suspended from the crossarm 12. A serviceman, at the legs 16 of the superstructure out of danger from the high voltage conductors, can then disconnect the strut insulator 46 at the universal joint 48 and screw the strut insulator 46 out of the clevis member 70. Advantageously the tapered opening 71 in the clevis member 70 permits self-aligning of a replacement insulator 46 into the insulator assembly 10. When a strut insulator 46 is removed from the clevis member 70, clevis member 70 will swing with the countersink downwards. A threaded member 68 on the end of a strut insulator 46 can, however, be worked into the proper position to align the threaded member 68 into the countersink 71b. Once the threaded member 68 has been worked into the countersink 71b the strut insulator 46 may then be handtightened and the universal joint 48 may be reassembled. The resilient gasket 73 provides a stop against which the threaded member 68 will seat while permitting sufficient relative rotational movement between the threaded member 68 and the clevis member 70.

Figure 1:
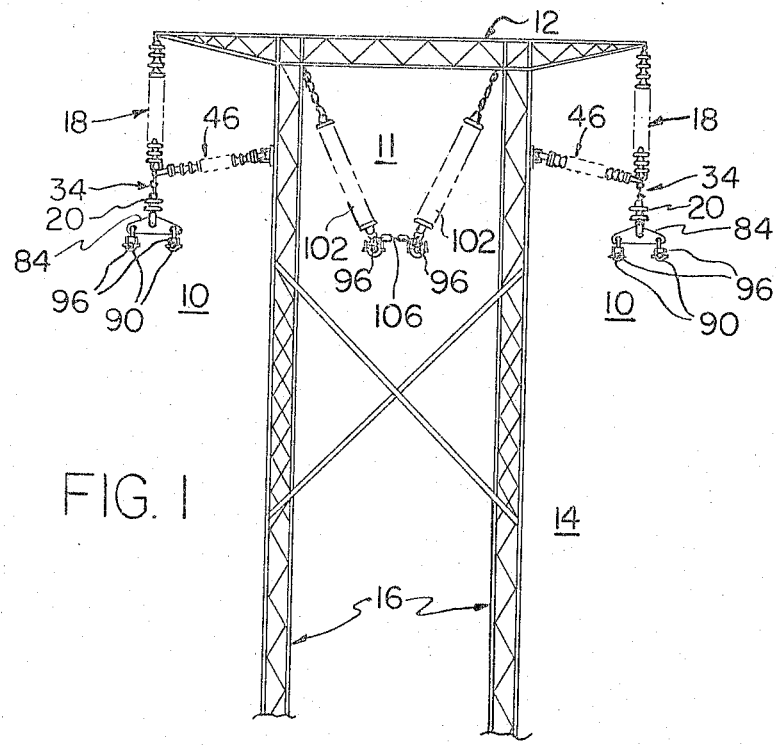
FIG. 1 is a fragmentary elevational view of a new and improved transmission line constructed in accordance with the present invention and illustrating the improved conductor support assemblies.
Figure 2:
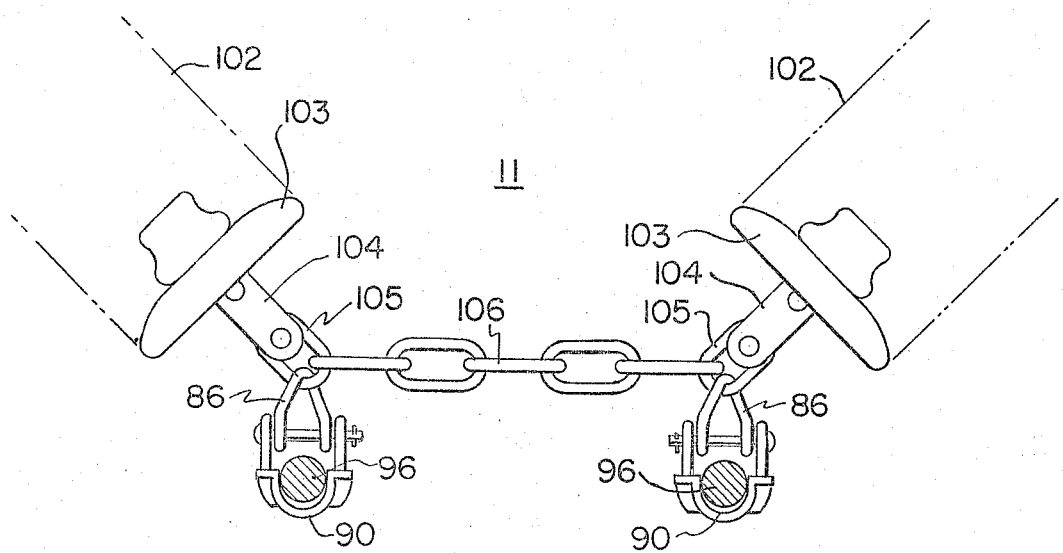
FIG. 2 is a fragmentary elevational view of one of the conductor support assemblies illustrated in FIG. 1.

In accordance with another feature of the present invention, there is illustrated the improved insulator assembly 11, best shown in FIG. 2, and including two flexible strings 102 of insulators 103. The insulators 103 may be identical with the insulators 20 heretofore described. Each of the flexible strings 102 of insulators has its upper end supported adjacent the intersection of the legs 16 and the crossarm 12 and spread outwardly from their lower ends so that the strings 102 hang in a general V-shape. A clevis link 104 is connected to the lowermost one of each of the insulators 103 and a chain 106 formed of a plurality of chain links 105 interconnects the clevis links 104. In this manner the lower ends of the strings 102 are held inwardly of the outer ends to provide the desired lateral stability to the insulating assembly 11. A pair of conductors 96 are supported in respective suspension clamps 90 which, in turn, are suspended from the end ones of the chain links 105 through respective twisted clevis pins 86.

The improved insulator assembly 11 advantageously is flexible in a direction along the power transmission line and at the same time provides lateral support to prevent swinging of the conductors 96 into the legs 16 of the superstructure 14. The clevis and tang arrangement of the insulator 20 turned at right angles to each other results in a particularly advantageous insulator string arrangement in the insulator assembly 20 capable of flexing in both directions and superior to those heretofore in use. It had been found, for example, that a wind in the area of 100 m.p.h. would cause an insulator swing from vertical such that the common ball and socket insulators would experience bent pins or crushed cotter keys. Moreover, it had been found that galloping conductor conditions could result in the uncoupling of the ball and socket insulator. Prior clevis insulators with all the pins in the same direction have flexibility in one plane only. Where strings of insulators up to about 10 feet in length are common, it is desirable to have flexibility of the insulator string in both planes. The insulators 20 according to the present invention permit the insulator strings 102 to flex or slacken under load conditions where the conductors 96 swing in opposite directions relative to each other without danger of damaging the strings.

Advantageously the use of chain 106 improves the dielectric distribution across the conductors 20 since the chain 106 couples the conductors 96 closer to the ends of the insulator strings 102 than is otherwise commercially feasible in installations as where a yoke plate is used.

While particular embodiments of the invention have been shown, it will be understood, of course, that the invention is not limited thereto since many modifications may be made, and it is therefore contemplated by the appended claims to cover all such modifications as fall within the true spirit and scope of the invention.

What is claimed as new and desired to be secured by Letters Patent of the United States is:

1. Apparatus for supporting an electrical transmission conductor from a superstructure of the type including a crossarm, said apparatus comprising: a flexible string of suspension type insulators, one end of said string secured to said crossarm and the other end thereof depending downwardly, a linking member in said string separating at least the lowermost one of said insulators from the remainder of said insulators in said string, a rigid strut insulator having one end secured to said superstructure and the other end secured to said linking member above one of said insulators, and conductor supporting means secured to the lower end of said insulator string.

2. Apparatus as defined in claim 1 wherein there are additionally provided swivel connecting means at the end of said strut insulator connected to said linking member including first member secured to said linking member and a second member secured to the end of said strut insulator, said first and second members threadedly engaging one another and rotatable in relation to one another in response to rotational movements of said strut insulator relative to said insulator string, and additionally including universal connecting means for connecting said strut insulator to said superstructure.

3. Apparatus as defined in claim 1 above where said linking member is formed of metal links to increase the capacitance of said lowermost insulators and thereby improve the voltage distribution across the insulator string.

4. Apparatus for supporting an electrical transmission conductor from a superstructure comprising a flexible string of suspension type insulators, one end of said string secured to said superstructure and the other end thereof depending downwardly, conductor supporting means secured to the lower end of said insulator string, a rigid strut insulator having one end secured to said superstructure, and swivel connecting means interconnecting the other end of said strut insulator with said insulator string.

5. Apparatus as defined in claim 4 above wherein said swivel connection includes a clevis member connected to said insulator string and provided with a countersunk threaded aperture, the outer portion of said countersunk aperture being tapered outwardly; and additionally includes a threaded male member extending from the end of said strut insulator for threaded connection with said clevis member.

6. Apparatus as set forth in claim 5 above wherein said swivel connecting means additionally includes a resilient gasket interposed between said clevis member and said threaded male member to provide a seat for said members while permitting relative rotational movement therebetween.

7. A supporting structure for an electrical transmission line comprising a superstructure including a crossarm, a pair of flexible strings of suspension type insulators carried adjacent respective ends of said crossarm, one end of each of said strings being secured to said crossarm and the other end thereof depending downwardly, a linking member in said string separating at least the lowermost one of said insulators from the remainder of said insulators in said string, a rigid strut insulator, a universal means connecting one end of said strut insulator to said superstructure, a swivel connection interconnecting the other end of said strut insulator with said linking member, said swivel connection including a clevis member connected to said linking member and provided with a countersunk threaded aperture, the outer portion of said countersunk aperture being tapered outwardly, a threaded male member extending from the end of said strut insulator defining a threaded connection with said clevis member, two additional flexible strings of insulators intermediate the first mentioned strings each having its upper end supported in spaced apart relation relative to said superstructure with flexible means interconnecting the lower ends thereof inwardly from their upper ends so that said strings hang in a general V-shape, and conductor supporting means respectively secured to the lower ends of said strings of insulators.

References Cited by the Examiner

UNITED STATES PATENTS

| | | | |
|---|---|---|---|
| 368,452 | 8/1887 | Bradford | 287—91 |
| 1,212,703 | 1/1917 | Steinberger | 174—150 |
| 1,253,919 | 1/1918 | Williams. | |
| 1,291,218 | 1/1919 | Sonneborn | 174—141 |
| 1,616,931 | 2/1927 | Thomas | 174—45 |
| 2,297,137 | 9/1942 | Fennema. | |
| 2,587,587 | 3/1952 | Bellezza et al. | 174—140 |
| 3,002,043 | 9/1961 | Jenner et al. | 174—40 |

OTHER REFERENCES

Electrical World, vol. 150, No. 15, Oct. 13, 1958; Tk–1.E6, p. 76, top figure.

Electrical World, vol. 159, No. 8, Feb. 25, 1963; Tk–1.E6, p. 116, General Electric ad.

LARAMIE E. ASKIN, *Primary Examiner.*

J. F. RUGGIERO, *Assistant Examiner.*